Patented Jan. 3, 1950

2,493,693

UNITED STATES PATENT OFFICE 2,493,693

MICA PRODUCT AND METHOD OF MAKING THE SAME

Alfred Eric Parkinson, East Lansdowne, Pa., assignor to Continental-Diamond Fibre Company, Newark, Del., a corporation of Delaware No Drawing. Application April 4, 1946, Serial No. 659,672

16 Claims. (Cl. 154—2.6)

1

The present invention relates to novel mica products of advantageous properties and to methods of making the same, and more particularly it relates to composite products comprising mica splittings held together by an inorganic binding material and characterized by desirable properties including unusual resistance to heat and moisture.

Heretofore, various inorganic binding materials have been suggested for use in the production of built-up mica plate from mica splittings but none of the materials used or suggested for use provides a mica plate which possesses all of the desired properties. For example, the use of sodium silicate, either alone or in combination with a material such as an alkali hydroxide or carbonate which provides a binder with a relatively low fusion point, leaves much to be desired since the electrical resistance properties are poor and over a period of time in contact with moisture the alkali silicate materials disintegrate completely.

One object of the present invention is, therefore, to provide a mica product in which the mica splittings are bound into a composite product which will withstand temperatures up to the disintegration temperature of the mica and will be substantially unaffected by contact with moisture.

Another object of the invention is to provide a product comprising mica splittings bound together by a film of an inorganic binder, which film forms a strong bond between the mica laminae, is relatively flexible, is substantially insoluble, and will withstand temperatures higher than the disintegration temperature of a good grade of mica.

A further object of the invention is to provide a built-up mica plate or product possessing good electrical properties which will remain substantially constant even in the presence of high humidity.

Still another object of the invention is to provide a built-up mica plate which can be readily sawed, punched, or sheared with conventional tools.

Other objects, including the provision of novel methods by which the mica product of the desirable properties described can be obtained, will be apparent from a consideration of the specification and the claims.

In accordance with the present invention, the mica splittings of the built-up mica product are bound together by the fused reaction product of an alkali metal silicate and an alkali metal aluminate, the alkali metal being selected from the group consisting of sodium and potassium. The splittings may be any type of mica, for example, muscovite or phlogopite mica splittings.

In the preferred embodiment, the binder is a

2 fused reaction product of an alkali metal silicate and an alkali metal aluminate, the alkali metal being selected from the group consisting of sodium and potassium, in which reaction product both sodium and potassium are present; for example, the fused reaction product of sodium silicate and potassium aluminate or of potassium silicate and sodium aluminate. Due to the availability, however, of sodium silicate and potassium aluminate, a fused reaction product of these two materials is advantageously employed. If desired, however, only one alkali metal may be present in the fused reaction product, in which case the product may be a fused reaction product of sodium silicate and sodium aluminate or of potassium silicate and potassium aluminate.

In preparing the product, the individual mica splittings are assembled in the usual manner and the aqueous solution of the binder is brought in contact with the assembled mica splittings by any suitable means, the solution being sufficiently dilute so that it may be readily applied to the splittings. The product is then heated under pressure to obtain a fused reaction product of the alkali metal silicate and the alkali metal aluminate as the binder for the mica splittings. More specifically in the manufacture of a built-up mica plate, the product is prepared by laying mica splittings to form a single plate and the aqueous solution of the binder is applied thereto by any convenient means. The single plate is dried to remove at least a portion of the water, and a plurality of the single plates are superposed with an aqueous solution of the binder applied therebetween. The water is then removed from the superposed plates and the plates are heated under pressure to obtain the fused reaction product of the alkali metal silicate and the alkali metal aluminate as a binder for the mica splittings and to provide a bond between the single plates.

The amount of binder present in the finished product may vary over a wide range and will be employed in an amount in any particular case to provide the desired bond; for example, the finished product may contain from about 15% to 30% or more of the fused binder.

The aqueous solution of the binder material comprises sodium and/or potassium ions, referred to herein as alkali metal ions, aluminate ions, silicate ions, and hydroxyl ions. In addition, the solution may, and usually will, contain other ions, for example the anions furnished by the compounds added to provide the ions referred to above. The presence of other ions, in addition to the ions furnishing the alkali metal silicate and alkali metal aluminate, is not disadvantageous provided that they do not interfere with the production of a fused reaction product of the alkali metal silicate and alkali metal aluminate, and the compounds resulting from the presence of such other ions in the binder solution may be chemically or physically in the fused binder material.

The silicate ions are provided by the addition of a soluble alkali metal silicate. The aluminate ions are provided by the addition of an alkali metal aluminate. The aluminate may be an alkali metal aluminate obtainable on the market or it may be formed by any suitable procedure, for example by the addition of an alkali metal hydroxide to freshly prepared aluminum hydroxide or to a solution of an aluminum salt, such as aluminum sulphate, potassium aluminum sulphate or aluminum chloride. The hydroxyl ions are furnished in part by the hydroxide used to prepare the alkali metal aluminate, an excess of said hydroxide being used, and in part by the alkaline metal silicate solution, or they may be furnished entirely by the alkali metal silicate solution if it is relatively high in alkalinity. From the above, it will be apparent that the alkali metal ions may be introduced from a number of sources, namely by the alkali metal silicate, by the aluminate solution and/or by the added alkali metal hydroxide.

In the preferred embodiment of the invention, the solution of the binder material is prepared by the use of sodium silicate solution, potassium aluminum sulphate (alum), potassium hydroxide, and water so that the solution contains sodium ions, potassium ions, silicate ions, aluminate ions, hydroxyl ions, and sulphate ions. In preparing the solution, it is advantageous to dissolve the alum and potassium hydroxide in separate portions of water, and then to add the potassium hydroxide solution to the alum solution. The potassium hydroxide is present in sufficient excess so that the aluminum hydroxide first precipitated is completely dissolved to form potassium aluminate, and this excess of hydroxide and any excess of Na₂O associated with the sodium silicate provide the necessary hydroxyl ions. After the formation of the aluminate solution, the sodium silicate is added rapidly to the aluminate solution, and advantageously up to about 40% of the silicate solution is added at one time to the aluminate solution to prevent the formation of a gel. As an alternative to the above, potassium silicate and a solution containing sodium aluminate may be used to form the binder solution. Instead of the preferred procedure in which the silicate solution is added rapidly to the aluminate solution, the aluminate solution may be added to the silicate solution, if desired.

Any soluble alkali metal silicate may be employed, either in solution or in solid form (after dissolution) and, therefore, the ratio of alkali metal oxide to silicon dioxide in the silicate may vary over a wide range. Examples of the sodium silicates which may be used are those which have the following approximate ratios of $Na_2O$ to $SiO_2$: 1 to 3.90; 1 to 3.30; 1 to 3.22; 1 to 2.40; 1 to 2.00; and 1 to 1.60. In place of using a silicate of this type where the $SiO_2$ content exceeds the $Na_2O$ content, an alkali metal silicate in which the $Na_2O$ content exceeds the $SiO_2$ content, may be used, if desired. Preferably, however, a silicate having a larger content of $SiO_2$ than of $Na_2O$ and having a relatively low softening of fusion point will be employed and very satisfactory results are obtained when the "U-Brand" product of the Philadelphia Quartz Company with an approximate ratio of $Na_2O$ to $SiO_2$ of 1 to 2.4 is employed.

The fusion point of the binder material may be controlled by varying the proportion of the alkali metal silicate and the alkali metal aluminate present in the binder solution and the ingredients are selected so that the binder will fuse when heated to a temperature between about 1200° F. and about 2000° F. In general, the ratio of alkali metal silicate ($X_2O \cdot SiO_2$ where X represents the alkali metal) to the alkali metal aluminate ($X_2O \cdot Al_2O_3$ where X represents the alkali metal) may be varied from about 100 to 1 to about 20 to 1, for example, the ratio may be about 37 to 1. While the particular melting point of the compound will depend on whether the alkali metal content is only sodium or is only potassium or is made up of both metals, the aforesaid ratios given apply to the various compositions. Since the alkali in addition to that associated with the alkali metal silicate is present in amounts merely to insure that the aluminate will remain in solution, the amount is advantageously not greatly in excess of the amount required for that purpose.

In an illustrative case, when the binder comprises the fused reaction product of "U-Brand" sodium silicate and potassium aluminate, the preferred ratio of the compounds is about 37 to 1 and the ratio of $Na_2O$ to $K_2O$ to $SiO_2$ to $Al_2O_3$ will, therefore, be about 23 to 1 to 55 to 1. In the case when the product is the fused reaction product of a similar potassium silicate and sodium aluminate, the preferred ratio of the two compounds is about 51 to 1 and the ratio of $Na_2O$ to $K_2O$ to $SiO_2$ to $Al_2O_3$ will, therefore, be about 1 to 53 to 83 to 1.6. When the binder is the fused reaction product of sodium silicate and sodium aluminate, the preferred ratio of the two compounds is about 45 to 1 and hence the ratio of $Na_2O$ to $SiO_2$ to $Al_2O_3$ will be about 22 to 51 to 1, and when potassium silicate and potassium aluminate are used, the preferred ratio of the two compounds is about 43 to 1 and hence the ratio of $K_2O$ to $SiO_2$ to $Al_2O_3$ is about 33 to 51 to 1.

In a typical example in the preparation of a binder material containing $Na_2O \cdot SiO_2$ and $K_2O \cdot Al_2O_3$ in a ratio of about 37 to 1, the following chemicals are employed:

Sodium silicate ("U-Brand")
        cubic centimeters__ 35
Potassium aluminum sulphate_____grams__ 3
 $Al_2(SO_4)_3 \cdot K_2SO_4 \cdot 24H_2O$
Potassium hydroxide_____do____ 2
Water_____cubic centimeters__ 30

In another example of a binder material containing $Na_2O \cdot SiO_2$ and $K_2O \cdot Al_2O_3$ in a ratio of about 87 to 1, the following chemicals are employed:

Sodium silicate ("U-Brand")
        cubic centimeters__ 245
Potassium aluminum sulphate_____grams__ 9
 $Al_2(SO_4)_3 \cdot K_2SO_4 \cdot 24H_2O$
Potassium hydroxide_____do____ 6
Water_____cubic centimeters__ 90

The "U-Brand" sodium silicate has a total solids content of 46.9%, a Baumé of 52°, a specific gravity of 1.56, and contains 13.8% $Na_2O$ and 33.1% $SiO_2$. The alum and potassium hydroxide are dissolved in separate portions of the water, the potassium hydroxide solution is added to the alum solution and the sodium silicate solution is then preferably added thereto rapidly.

While the invention is not to be limited to any particular theory of the reaction, the indications are that the binder solution is not merely a mixture of compounds but contains definite compounds in solution and that during fusion a mixture of insoluble sodium and potassium aluminum silicates or an insoluble sodium or potassium aluminum silicate is formed. The fused compound may be an ortho aluminum silicate or a meta aluminum silicate or a mixture of the ortho and meta compounds.

While various built-up mica products may be made by the use of the novel binding material and various methods may be employed, so long as the binder is fused during the manufacture of the product, the invention will be described with specific reference to the production of a built-up mica plate. In a typical case, single mica plates are prepared by the usual well-known process except that it is not necessary to remove all the solvent (water). For example, the mica splittings are laid in the usual manner and the binder solution, for example a binder material containing $Na_2O.SiO_2$ and $K_2O.Al_2O_3$ in a ratio of about 37 to 1 prepared as above described and diluted with about an equal amount of water, is sprinkled, sprayed, or brushed on or otherwise applied to the mica splittings. The water is partially or entirely removed and the plates are then cut to the requisite size. The desired thickness of plate is obtained by laminating two or more of the single plates together using an additional amount of the binder solution as a cement. The assembled plate is dried between 1 inch mesh wire screens in an oven for 12 to 15 hours at 85° C. to 100° C. After this drying, the sheets may be cut or sawed in two if desired, since this operation breaks the "seal" formed on the edges by the water evaporating from the binder, thus facilitating the escape of water in the subsequent heating step. The sheets are then placed between 16 gauge metal pans and dried in an oven for 9 to 10 hours at a temperature of 500° F. to 700° F. After this drying operation, several plates are placed in a steel clamp and subjected to 250 to 1000 pounds per square inch pressure in a hydraulic press in order to tighten the clamp to maintain the pressure. The tightened clamp containing the mica sheets is then placed in a muffle furnace and heated from 2 to 4 hours at 1300° F. to 1500° F. to fuse the binder. The hot clamp is removed from the furnace and placed in a hydraulic press and subjected to pressure of about 150 to about 800 pounds per square inch until the mass is cool. In order to prevent sticking of the laminated built-up mica plates to one another, and to prevent the binder from coming into contact with the screen or metal pressing plate, mica splittings or powdered mica may be sprinkled on the surfaces. The finished plate may contain from about 15% to 30% or more of the fused binder. The product will, therefore, usually contain from about 85% to about 70% of mica.

If desired, borax glass, as a fluxing agent, may be sprinkled or dusted between each layer of the single plates which are assembled into the laminated product in order to increase the resiliency and to render the built-up plate more rigid, as described and claimed in copending application Serial No. 659,671, filed April 4, 1946 in the name of Randall H. Shepard.

The built-up mica products of the invention have exceptionally high dielectric strength, high insulating value, and excellent heat resistant properties. Furthermore, these properties are not subject to substantial change due to conditions encountered during the normal use of material. The products can, therefore, be used successfully under humid atmospheric conditions.

The products due to their advantageous properties are available for a wide variety of uses in the industries and can be utilized wherever products made of mica alone are applicable for use. The use of the built-up mica product of the invention as heater plates in electric irons, toasters, waffle irons, and the like and in the winding of the heating element wires in electric furnace individual heaters are instances of the utility of the product.

Considerable modification is possible in the ratio of the alkali metal silicate to aluminate employed in the binder material as well as in the methods used in producing the built-up mica product, without departing from the essential features of the invention.

I claim:

1. A built-up mica product comprising mica splittings bound together by the water-insoluble product of the fusion of a water-soluble reaction product of a water-soluble alkali metal silicate and a water-soluble alkali metal aluminate, the alkali metal being selected from the group consisting of sodium and potassium.

2. The product of claim 1 wherein the ratio of alkali metal silicate to alkali metal aluminate is between about 100 to 1 and about 20 to 1.

3. A built-up mica product comprising mica splittings bound together by the water-insoluble product of the fusion of a water-soluble reaction product of a water-soluble alkali metal silicate and a water-soluble alkali metal aluminate, the alkali metal being selected from the group consisting of sodium and potassium, in which reaction product both sodium and potassium are present.

4. The product of claim 3 wherein the ratio of alkali metal silicate to alkali metal aluminate is between about 100 to 1 and about 20 to 1.

5. A built-up mica product comprising mica splittings bound together by the water-insoluble product of the fusion of the water-soluble reaction product of sodium silicate and potassium aluminate.

6. The product of claim 5 wherein the ratio of sodium silicate to potassium aluminate is between about 100 to 1 and about 20 to 1.

7. The product of claim 5 wherein the ratio of sodium silicate to potassium aluminate is about 37 to 1.

8. A built-up mica plate comprising a plurality of superposed plates of mica splittings, the individual mica splittings in said plates and the said plates being bound together by the water-insoluble product of the fusion of a water-soluble reaction product of a water-soluble alkali metal silicate and a water-soluble alkali metal aluminate, the alkali metal being selected from the group consisting of sodium and potassium.

9. A built-up mica plate comprising a plurality of superposed plates of mica splittings, the individual mica splittings and the said plates being bound together by the water-insoluble product of the fusion of a water-soluble reaction product of a water-soluble alkali metal silicate and a water-soluble alkali metal aluminate, the alkali metal being selected from the group consisting of sodium and potassium, in which reaction product both sodium and potassium are present.

10. A built-up mica plate comprising a plurality of superposed plates of mica splittings, the individual mica splittings and the said plates being bound together by the water-insoluble product of the fusion of a water-soluble reaction product of sodium silicate and potassium aluminate.

11. The steps in the process of making a built-up mica product which comprises assembling mica splittings to form a product, applying thereto an aqueous solution comprising silicate, aluminate, and hydroxyl ions and alkali metal ions selected from the group consisting of sodium and potassium, and heating said product under pressure to obtain the water-insoluble product of the fusion of a water-soluble reaction product of a water-soluble alkali metal silicate and a water-soluble alkali metal aluminate as the binder for said mica splittings.

12. The process of claim 11 wherein the solution contains both sodium and potassium ions.

13. The process of claim 11 wherein the solution contains both sodium and potassium ions and wherein sodium ions are provided by sodium silicate and potassium ions are provided by potassium aluminate.

14. The steps in the process of making a built-up mica plate which comprises laying mica splittings to form a single plate, applying thereto an aqueous solution comprising silicate, aluminate, and hydroxyl ions and alkali metal ions selected from the group consisting of sodium and potassium, drying said plate to remove at least a portion of the water, superposing a plurality of said single plates with an aqueous solution containing the ions above recited applied therebetween, removing the water from said superposed plates and heating said superposed plates under pressure to obtain the water-insoluble product of the fusion of a water-soluble reaction product of a water-soluble alkali metal silicate and a water-soluble alkali metal aluminate as the binder for said mica splittings and to provide a bond between said single plates.

15. The process of claim 14 wherein the solution contains both sodium and potassium ions.

16. The process of claim 14 wherein the solution contains both sodium and potassium ions and wherein sodium ions are provided by sodium silicate and potassium ions are provided by potassium aluminate.

ALFRED ERIC PARKINSON.

REFERENCES CITED

The following references are of record in the file of this patent:

UNITED STATES PATENTS

| Number | Name | Date |
| --- | --- | --- |
| 1,578,812 | Dawes | Mar. 30, 1926 |
| 1,707,277 | Okuri | Apr. 2, 1929 |
| 1,975,078 | Broughton | Oct. 2, 1934 |
| 2,231,718 | Hill | Feb. 11, 1941 |
| 2,378,927 | Jewett | June 26, 1945 |